No. 735,775. Patented August 11, 1903.

UNITED STATES PATENT OFFICE.

PAUL JULIUS AND FRIEDRICH REUBOLD, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

SUBSTANTIVE SULFUR DYE.

SPECIFICATION forming part of Letters Patent No. 735,775, dated August 11, 1903.

Application filed March 16, 1901. Serial No. 51,505. (Specimens.)

*To all whom it may concern:*

Be it known that we, PAUL JULIUS, doctor of philosophy and chemist, a subject of the Emperor of Austria-Hungary, and FRIEDRICH REUBOLD, doctor of philosophy and chemist, a subject of the King of Bavaria, both residing at Ludwigshafen-on-the-Rhine, in the Kingdom of Bavaria, Germany, have invented new and useful Improvements in Substantive Sulfurized Dyes, of which the following is a specification.

We have discovered that if dinitro-meta-dichlor-benzene be treated with alkali thiocyanates (also called "alkali sulfocyanides") in the presence of a suitable solvent or diluent both chlorin atoms are replaced by the thiocyanogen group. This reaction can be effected by allowing mixed solutions of dinitro-dichlor-benzene and potassium thiocyanate to stand for a sufficient time in the cold. Judging from the method of its formation the new product possesses the constitution represented by the following formula:

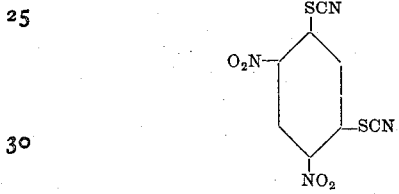

We have discovered that this new body (which we regard as dithiocyan-dinitro-benzene) enters readily into reaction with aromatic compounds containing a free amido group, such as amido-phenols and their sulfo and carboxylic acids. The reaction is preferably effected by heating a mixture of one molecular proportion each of the amido-phenolic body and the above di-thiocyan-dinitrobenzene, using alcohol as solvent or diluent and at a temperature of from fifty (50°) to seventy (70°) degrees centigrade in the presence of an agent capable of binding acid, such as sodium acetate. In the reaction that takes place one thiocyan group appears to be replaced by the residue of the amido-phenolic body employed. In this way a series of new bodies is obtained, which may be represented in their constitutions by the following general formula:

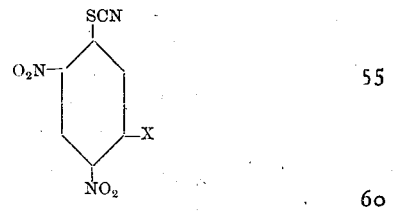

In this formula X represents the residue of the amido body used in the condensation. As instances of the amido bodies that can be used in carrying out this invention we mention para-amido-phenol, para-amido-phenol-ortho-sulfoacid, and para-amido-salacylic acid. Equivalent bodies can be obtained by the use of, for instance, potassium hydrosulfid or of a salt of xanthic acid in condensation with a chlorinated benzene derivative. Thus one molecular proportion of 1.3.4.6 dinitro-dichlorbenzene can be combined with one molecular proportion of para-amido-phenol, and the dinitro-chlor-para-hydroxy-diphenylamin thus formed can be treated with a hydrosulfid (either in a separate operation or in the melt) or with a salt of xanthic acid. All of these new bodies are to be regarded as thio derivatives of nitro-hydroxy-dialphylamin. On suitable oxidation corresponding sulfo-acids can be obtained. Hereinafter we apply to potassium hydrosulfid, potassium thiocyanate, and potassium xanthate, as well as all their equivalents, the generic term "thionizing agent" as including all of them. We have further discovered that the said new bodies (thio derivatives of nitro-hydroxy-dialphyl-amin are particularly well suited for yielding substantive dyes for cotton upon treatment with sulfur and sodium sulfid at a high temperature. The coloring-matters so obtained, using the products from the new sulfocyan compound and the amido-phenolic bodies mentioned, dye unmordanted cotton, giving, in the first place, greenish-gray-black shades, but the coloration so obtained changes on exposure to warm air. This may be effected as follows: Prepare a dye bath by means of our new dye, (sodium sulfid and water;) suitably work the goods to be dyed in this bath, ring them out and allow the same to dry slowly in a drying-room whose temperature is about sixty (60°) degrees centigrade. After treatment in this way the shade is a deep blue, possessing to a high degree fastness against the action of washing and against the action of alkalies and acids.

The following examples will serve to illustrate the manner in which our invention may best be carried into practical effect; but the invention is not confined to the examples given nor to the conditions therein described. The parts are by weight.

Example 1. *Production of meta-dinitro-dithiocyan-benzene from dinitro-dichlor-benzene and potassium-thiocyanate.*—Dissolve about four hundred and seventy-four (474) parts of dinitro-dichlor-benzene in one thousand (1,000) parts of acetone and add three hundred and ninety (390) parts of finely-powdered potassium-thiocyanate. Agitate the mixture at ordinary temperature. In a short time the desired condensation product separates out in the crystalline state, as does also the potassium-chlorid formed. Collect the mixture by filtration, grind it with water in order to dissolve the potassium-chlorid, filter, wash with water, and dry. This condensation can also be effected in alcoholic solution. In this case it is desirable to heat the solution to about forty (40°) to fifty (50°) degrees centigrade. Further, other thiocyanates can be used in place of potassium-thiocyanate. The new dinitro-dithiocyan-benzene thus obtained in the dry and powdered state has a yellowish color and is practically insoluble in water, very slightly soluble in cold benzene or cold alcohol, readily soluble in boiling glacial acetic acid and in hot acetone, and slightly soluble in boiling alcohol. It can be recrystallized from the hot alcoholic solution.

Example 2. *Production of ortho-para-dinitro-meta-thiocyan-para-hydroxy-diphenyl-amin from meta-dinitro-dithiocyan-benzene and para-amido-phenol.*—Mix together about two hundred and eighty-two (282) parts of dinitro-dithiocyan-benzene, one hundred and ten (110) parts of para-amido-phenol, (in the form of base,) and one hundred and fifty (150) parts of crystallized sodium acetate, and suspend this mixture in two thousand five hundred (2,500) parts of ethyl alcohol, (containing about ninety-six per cent. of $C_2H_5OH$.) Heat the mixture to about sixty (60°) to sixty-five (65°) degrees centigrade and maintain the heat for about eight (8) hours. Then allow the whole to cool and collect the reaction product by filtering. Wash with alcohol, press, and dry. In the dry and powdered state it is of a red color. With cold concentrated sulfuric acid it gives a brown color, which becomes green when diluted with water. It is practically insoluble in cold water and but slightly soluble in boiling water. It is quite insoluble in cold benzene, but somewhat more soluble in boiling benzene. It is soluble in acetone, glacial acetic acid, and in ethyl alcohol when boiled with these solvents. In a similar way the new condensation products can be obtained when using para-amido-phenol-ortho-sulfoacid, (preferably in the form of its sodium salt,) or para-amido-salicylic acid.

Example 3. *Production of a new coloring-matter.*—Mix together three hundred (300) parts of crystallized sodium sulfid, eighty (80) parts of powdered sulfur, and one hundred and fifty (150) parts of water. Heat the mixture in an iron pot standing in an oil bath and furnished with a stirrer. When no further solution takes place, allow the mixture to cool to about forty (40°) degrees centigrade, then add gradually, while continually stirring, one hundred (100) parts of ortho-para-dinitro-meta-thiocyan-para-hydroxy-diphenylamin, such as can be obtained in the manner described in the foregoing examples. During this addition the temperature should not rise above ninety (90°) to one hundred (100°) degrees centigrade. Continue stirring the mixture, and raise the temperature gradually to about one hundred and sixty (160°) to one hundred and eighty (180°) degrees centigrade, and maintain this heat until the reaction mass is completely dry and can readily be powdered. The product so obtained can be directly used in dyeing cotton in the well-known way for sulfur dyes. In the dry and powdered state it is of a black color. With water it yields a greenish-black colored solution in which an excess of hydrochloric acid produces a blackish flocculent precipitate. The coloring-matter is practically insoluble in cold acetone, benzene, glacial acetic acid, and in cold ethyl alcohol. In an analogous manner equivalent coloring-matters can also be obtained from the equivalent condensation products hereinbefore mentioned.

Now what we claim is—

1. The process of making substantive sulfurized dye which consists in treating dinitro-meta-dichlor-benzene successively with a hereinbefore-defined thionizing agent, and an aromatic amido-oxy substance and then melting this result with sulfur and sodium sulfid.

2. The process of making substantive sulfurized dye which consists in melting a hereinbefore-defined thio derivative of nitro-hydroxy-dialphylamin with sulfur and sodium sulfid.

3. As a new article of manufacture substantive sulfurized dye which can be made from ortho-para-dinitro-thiocyan-para-hydroxy-diphenylamin, sulfur and sodium sulfid which in the dry and powdered state is of a black color soluble in water in the presence of sodium sulfid giving a greenish-black colored solution in which an excess of hydrochloric acid produces a blackish flocculent precipitate, practically insoluble in cold acetone, benzene, glacial acetic acid and in cold ethyl alcohol, and which dyes unmordanted cotton from a bath containing sodium sulfid shades which turn blue upon exposure to warm air.

In testimony whereof we have hereunto set our hands in the presence of two subscribing witnesses.

PAUL JULIUS.
FRIEDRICH REUBOLD.

Witnesses:
JOHN L. HEINKE,
MAX BAZLEN.